Figure 1:
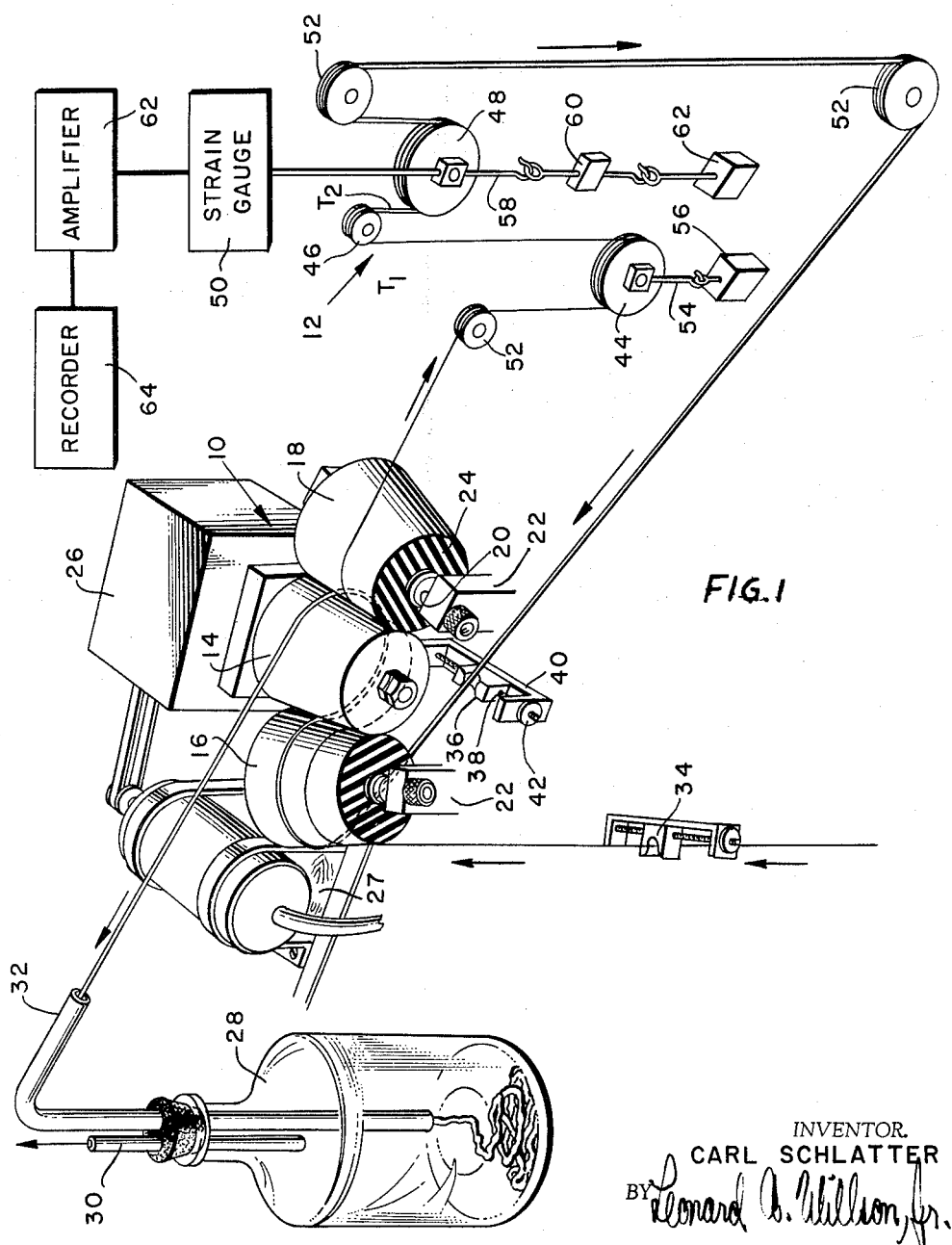

Oct. 5, 1965     C. SCHLATTER     3,209,589
YARN FRICTION MEASURING INSTRUMENT
Filed May 22, 1962     2 Sheets-Sheet 1

INVENTOR.
CARL SCHLATTER
BY Leonard A. Willson, Jr.
ATTORNEY

United States Patent Office 3,209,589
Patented Oct. 5, 1965

3,209,589
YARN FRICTION MEASURING INSTRUMENT
Carl Schlatter, Wilmington, Del., assignor to Monsanto Company, a corporation of Delaware
Filed May 22, 1962, Ser. No. 196,774
12 Claims. (Cl. 73—160)

This invention relates generally to friction measuring apparatus and more particularly to a mechanism for accurately and continuously measuring the friction generated by the movement of a given yarn at varying speed and varying initial tensions over selected friction devices.

Many instrumental arrangements for measuring yarn friction have been described in the literature. They all have limitations regarding their accountability of the many parameters which affect friction, one very important parameter being the limitation of yarn speed.

Past work has shown great differences in frictional behavior between yarns carrying different finish formulation. Furthermore, it has been shown that yarn friction measured at low speeds of a few centimeters per minute is radically different from friction measured at speeds of 10 meters per minute, or more. To illustrate, if a series of finishes is arranged in order of ascending friction when tested at one speed, this order is practically reversed when the tests are carried out at another, for example, higher speed. Furthermore, the friction experienced at the slower speed is often of the stick-slip variety, whereas, at considerably higher speeds, on the order of 10 meters per minute or more, it is not. These statements hold true whether a series of finishes are applied to, for example, rayon, acetate, or nylon, and it must therefore be concluded that different friction mechanisms are operative at the different speed levels and that this is the result of the properties of a particular finish.

Naturally, the question arises as to how and at what speed friction changes from one mechanism to another, the answer to which would be of considerable assistance in any attempt to correlate bulk finish properties with the finish porperties of the films deposited on the yarns. It is evident that an instrument which will give this information must have a continuous speed range from a few tenths of a millimeter per minute to several hundred meters per minute.

Furthermore, the instrument must enable the operator to change from any speed to any other desired speed quickly and without disturbing the yarn at the friction surface.

In most textile work, yarn and fiber friction are evaluated by measurements of yarn tensions before and after the yarn is pulled over a suitable friction surface; such initial and final yarn tensions will be hereinafter referred to as $T_1$ and $T_2$, respectively. The difference, $T_2$ minus $T_1$, is the friction force as defined by the classical investigators.

It is well known that friction increases with initial yarn tension. The slope of the curve $T_2$ minus $T_1$ vs. $T_1$ varies greatly for different finishes and for a given finish applied to various yarns. Therefore, it is essential that measurements of $T_2$ be made for constant and exactly known values of $T_1$. In addition, it must be possible to operate the instrument at any desired $T_1$ value compatible with the tensile properties of the yarn down to as low a value as will still cause the yarn to move regularly over pulleys and friction pin, or other desired friction surface.

Furthermore, in all yarn friction measuring instruments that rely on a gravimetric arrangement to provide a constant initial tension $T_1$, it is essential, if operation is to be continuous, that the yarn fed into the gravimetric arrangement exactly equal the weight of the yarn withdrawn therefrom; otherwise, the limits of operation of the gravimetric tension control will be exceeded and the experiment interrupted.

A widely employed prior art device designed to maintain a predetermined greater yarn take-up speed, relative to the rate at which the yarn is fed out, to thereby maintain constant the weight of yarn subjected to elongation between the points of feed and take-up, is the use of feed and take-up rolls synchronized to effect a predetermined differential in the respective speeds of such rolls. It has been found, however, that such an arrangement does not meet the need for a device capable of maintaining a virtually unvarying differential between the yarn feed and take-up speeds, yet which will allow an easy and accurate adjustment of such differential.

The above noted difficulties are overcome and further advantages realized in the practice of the herewith disclosed invention.

It is, accordingly, an object of the present invention to provide a yarn friction measuring instrument capable of continuously measuring yarn friction to a high degree of accuracy; a further object is to provide a continuously operable yarn friction measuring instrument capable of maintaining constant a desired initial yarn tension through a wide and continuously variable range of yarn speeds; still another object of the present invention is to provide a continuously operable yarn friction measuring instrument capable of maintaining constant any desired initial yarn tension while propelling the yarn at varying speeds over or through any desired friction generating device, which instrument further comprehends the employment of a unique and easily operable yarn propelling mechanism capable of feeding and withdrawing a constant weight of yarn; yet another object is an instrument fulfilling the above stated objectives and further capable of gravimetrically maintaining constant initial yarn tension; a still further object of this invention is to provide a novel yarn propelling mechanism for use in making yarn friction determinations, which mechanism functions as both a feed and take-up device; a still further objective is to provide a yarn propelling mechanism which simultaneously functions as both a yarn feed and take-up device, which mechanism is designed to feed and take up an unvarying yarn weight even though the yarn is subjected to varying degrees of elongation between the points of yarn feeding and yarn take-up. Yet another object is to provide an improved method for determining yarn friction characteristics as a function of yarn finish, tension and speed, the practice of which method affords heretofore unattainable accuracy of control in maintaining constant desired magnitudes of yarn tension and speed in comprehending a sequence of steps resulting in the feeding and withdrawal of equal weights of yarns subjected to intermediate stretching influences.

In accordance with one aspect of the invention, the foregoing and other objects are attained by providing a yarn propelling mechanism which realizes several important improvements over the prior art by virtue of the utilization of a set of contiguous, tapered rolls mounted on non-parallel axes and driven by a continuously variable speed drive mechanism. By virtue of the arrangement and configuration of these rolls, it is possible to feed and take up an unvarying weight of yarn, even though the yarn is subjected to varying degrees of elongation intermediate its departure and re-engagement with the yarn propelling mechanism.

In accordance with another aspect of this invention, these and further objectives are attained by the utilization of such a yarn propelling mechanism in combination with a friction generating, tension regulating apparatus capable of maintaining constant initial yarn tension by the utilization of a gravimetrically actuated constant tension pulley arrangement which is such that varying degrees of initial tension and varying types of friction generating means may be employed. By virtue of the unique ability of the yarn propelling mechanism to supply and withdraw a constant weight of yarn from the tension regulating apparatus, the latter is spared a heretofore trying source of error.

In accordance with another aspect of this invention, the foregoing and other objects are attained by the practice of a new method of supplying and withdrawing yarns from a friction generating, tension regulating apparatus in such a fashion as to assure that the same weight of yarn is withdrawn from said apparatus as is supplied thereto, whereby the differential in the speeds of the yarn approaching and departing such apparatus is purely a function of variation in yarn length, which is in turn a function of yarn friction.

Figure 2:
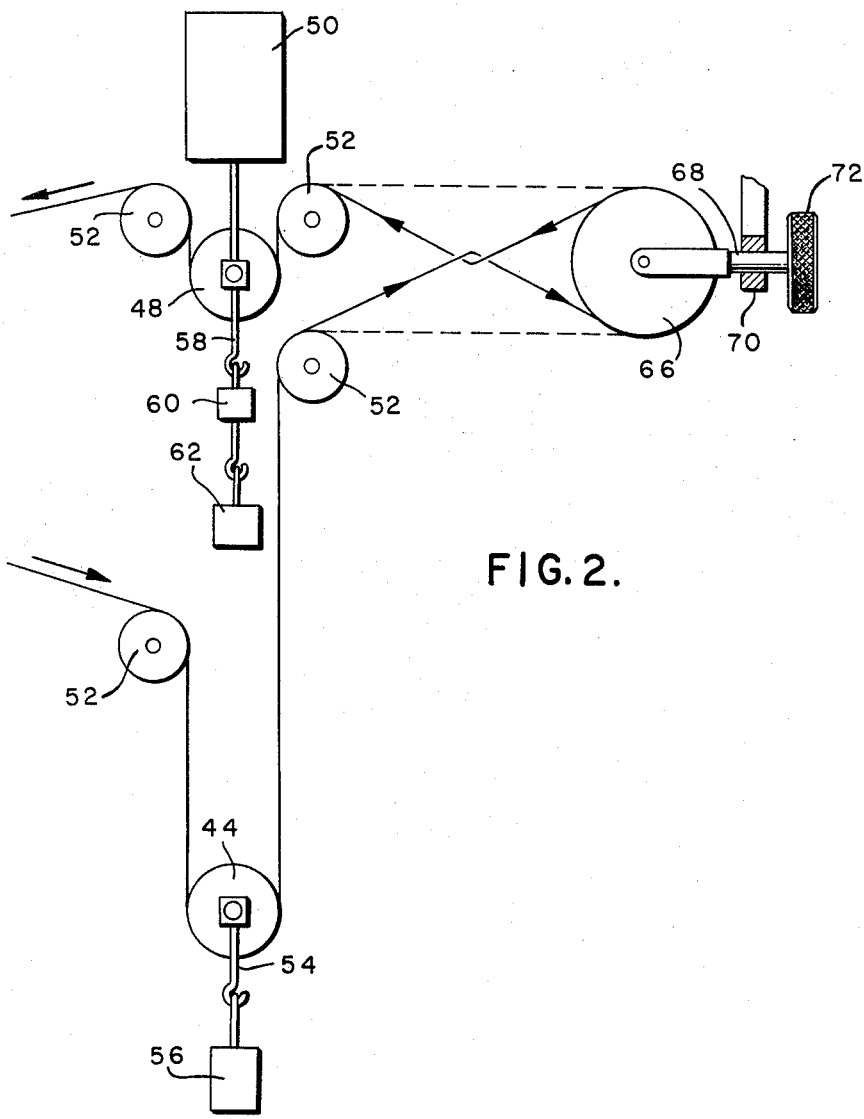

In the accompanying drawings, FIG. 1 is a partially schematic, perspective view showing one possible arrangement of the yarn propelling mechanism and the friction generating, tension regulating mechanism for use in measuring yarn to metal friction and the like;

FIG. 2 is a diagrammatic representation of another embodiment of the friction generating, tension regulating mechanism particularly suitable for measuring yarn to yarn friction.

Referring now in detail to the drawings, wherein like reference numerals designate identical or corresponding parts throughout the several views, and more particularly to FIG. 1, the yarn friction measuring instrument constituting one aspect of the present invention is seen to comprise a yarn propelling mechanism, generally indicated by arrow 10, and a friction generating, tension regulating and measuring mechanism, generally indicated by arrow 12, the yarn passing through the latter mechanism being referred to as the test loop. As later will be explained, mechanism 12 is of such design as to require an identity of the weights of yarn being fed to and withdrawn therefrom if continuous operation is to be possible. Yarn propelling mechanism 10 cooperates with mechanism 12 to fulfill this requirement in a novel and most advantageous manner, resulting in yarn friction determinations of heretofore unattainable ease and accuracy.

Considering, now, the details of the yarn propelling mechanism there is shown a roller assembly, illustrated as comprising three circumferentially contiguous rolls, a middle roll 14, and two end rolls 16, 18 disposed on opposite sides of the middle roll. These rolls are provided with a linear taper on the order of five degrees, but the degree of taper may vary over a wide range, depending on space requirements and the magnitude of yarn speed differential that may be encountered. For example, where differential in the speeds of departure and re-engagement of the yarn with the rolls is small and the yarn is caused, for example, to depart smaller circumferences of the rolls and to re-engage larger circumferences thereof, the axial spacing, with respect to the rolls, between the paths of the departing and re-engaging yarn may be undesirably small unless rolls of very gradual taper are employed. Where widely varying yarn speed differentials will be encountered, it may be found desirable to provide interchangeable sets of matched rolls having varying degrees of taper, whereby no one set of rolls need be unduly elongated. Of course, space permitting, a single set of very gradually tapering rolls may be employed which are sufficiently elongated to accommodate a wide range of yarn speed differentials. Rolls 14, 16, 18 are rotatably mounted about diverging axes by means of internal ball bearings 20 located at either end of each roll and supported by bearing mounts 22. The angle of divergence of the axes of rotation of the rolls can vary over a wide range and is controlled by the choice of roll taper. Preferably, alternate rolls, such as rolls 16, 18 are formed of a rubber-like material having relatively greater resilient deformability as compared to interposed rolls, such as roll 14, to thereby minimize the tendency of inter-roll slippage, both circumferential and axial, of the yarn about such rolls. As shown in the drawings, each roll is mounted to be circumferentially contiguous with its adjacent rolls, the inter-roll pressure being no more than is necessary to insure against inter-roll slippage. The roll assembly is driven at a continuously variable speed by means of a variable speed drive, diagrammatically indicated at 26, which may comprise, for example, a variable speed electric motor 27 driving through a conventional adjustable gear box of the type which facilitates a ready conversion between varying gear ratios. Desirably, final withdrawal of the yarn from the yarn propelling mechanism is accomplished at minimal tension, such as by use of a vessel 28 connected to a vacuum source 30 and having a yarn guide tube 32 communicating with the interior of the vessel and operative to suction off and store yarn waste. To control the paths of the yarn over the rolls, there is provided a pair of guides 34, 36, each mounted on a threaded shaft 38 supported in mounting bracket 40. Threaded on shaft 38 exteriorly of bracket 40, there is provided a thumb nut 42, whereby, on turning the thumb nut, guide 36 may be caused to reciprocate axially of the roller assembly to selected positions. Guide 34 is located between the roll assembly and the initial source of yarn supply and functions to control the axial location of the yarn path over the rolls prior to entry into the test loop. Guide 36 engages the yarn as it exits from the test loop and lays it over a desired path on the rolls just prior to its withdrawal to waste. Operation of the yarn propelling mechanism will be more fully related after reference has been had to the friction generating, tension regulating mechanism 12.

The friction generating, tension regulating mechanism 12 is seen to comprise basically a free-floating constant tension pulley 44, a friction surface 46, here shown as a conventional friction pin, and a strain gauge pulley 48 interconnected to a conventional strain gauge 50. Suitable guide pulleys 52 are provided throughout the test loop to guide the yarn from the yarn propelling mechanism over the constant tension pulley 44, friction surface 46 and strain gauge pulley 48, back to the yarn propelling mechanism 10. Preferably, all of the pulleys employed in the test loop passing through mechanism 12 are of the frictionless, low-inertia type which turn on precision miniature ball bearings. The constant tension pulley 44 is provided with a depending hook 54 from which may be hung selected weights 56, whereby the initial tension $T_1$ in the yarn can be adjusted to any value compatible with the tensile properties of such yarn. The strain gauge pulley 48 is provided with a similar hook 58, from which depends a balance weight 60 which is equal to the weight of the constant tension pulley 44, plus hook 54, less weight 56. Depending from balance weight 60 is weight 62, which is chosen to match weight 56. With this arrangement of the weights, the forces acting on the strain gauge pulley 48 are twice the yarn tension $T_2$ in the upward direction and twice the yarn tension $T_1$ in the downward direction. Now, if $2T_2$ minus $2T_1$ is equl to 2F, F being the friction force, this means that the output of the strain gauge is proportional to the yarn friction value.

Now, if the friction surface 46 is replaced with a frictionless pulley the total friction in the test loop is the sum of the friction of all the pulleys. It can easily be shown that this value is negligible by running the yarn with the replacement of the friction pin and noting the deviation of the recorder 64 from the zero line. With satisfactory pulleys, it has been found that the recorder does not move appreciably from the zero line. It is, therefore, apparent that the friction and inertia due to the various pulleys has only a negligible effect on friction determinations and may, for all practical purposes, be ignored. Conveniently, strain gauge 50 may be connected to a suitable amplifier 62 and recorder 64, whereby tension measurements, as a function of friction, are permanently recorded.

Before proceeding to a description of the method of determining yarn friction by use of the present invention, reference will be had to a modification of the friction generating, tension regulating mechanism particularly designed for use in determining yarn-to-yarn friction, such an arrangement being illustrated in FIG. 2. This arrangement is basically quite similar to the mechanism 12 shown in FIG. 1, save for replacing the friction surface 46 with an assembly designed to guide the yarn over itself with selective degrees of yarn surface contact. This is accomplished by providing a yarn twisting pulley 66 located at a position intermediate the constant tension pulley 44 and the strain gauge pulley 48. Pulley 66 is mounted to be selectively rotated at increments of 180° about an axis perpendicular to its axis of spin by means of a shaft 68 journaled in a stationary collar 70, the shaft terminating in a knurled knob 72. By training the yarn over pulley 66, as illustrated in FIG. 2, and by turning knob 72 at increments of 180°, the strands of yarn approaching and departing pulley 66 can be twisted over themselves a desired number of times to provide the desired degree of yarn-to-yarn surface contact. In other respects, the operation of this modification of the test loop is identical to that illustrated in FIG. 1.

In operation, yarn which is to be subjected to an elongating influence, is passed over the roller assembly along a path which encounters the smaller ends of rolls 14, 16, 18, which path may be controlled by manipulation of guide 34. The yarn is withdrawn from the roll assembly and passed about suitable guide pulleys, constant tension pulley 44, friction surface 46, strain gauge 48, thence back to the roller assembly, by way of guide 36. Guide 36 is adjusted to lay the yarn back onto the roller assembly in a path axially spaced from the path of the yarn departing the roll for the test loop. Variable speed drive means 26 is then set in motion and the behavior of constant tension pulley 44 is observed. If pulley 44 tends to rise, the yarn is being withdrawn from the test loop at too rapid a rate. Consequently, guide 36 is adjusted to urge the yarn returning from the test loop over a path on the roll which is closer to the path of the yarn departing for the test loop, i.e. over a smaller roller circumference. Since the returning yarn is now operating over a smaller roll circumference, the differential in the linear speed of the yarn entering and leaving the test loops is decreased and the tendency of constant tension pulley 44 to rise will likewise decrease. If pulley 44 tends to fall, guide 36 is manipulated to effect a greater spacing between the paths of the yarn departing and returning to the roller assembly to thereby increase the differential in the linear speeds of the yarn entering and departing the test loop. With little trouble, a point will soon be reached where constant tension pulley 44 is stabilized at a fixed vertical position, at which time the weight of the yarn entering the test loop exactly equals the weight of the yarn being withdrawn therefrom, even though yarn elongation is occurring at an intermediate point about friction surface 46. Since pulley 44 is stabilized, tension measurements at pulley 48 will be a function solely of the tension increment encountered across friction surface 46.

The showing in FIG. 1 of the drawings of a smaller diameter yarn, indicated by a single solid line, entering the tension regulating mechanism 12 and a larger diameter yarn, indicated by a pair of spaced lines, departing such mechanism more graphically indicates the paths of the departing and returning yarn over the rolls of the propelling mechanism 10, as well as to indicate the point at which the added tension due to friction is imparted to the yarn i.e., at friction device 46.

It will be seen that the instrument is of such design that it is continuously operable and continuously variable without the necessity of interrupting a test run. For example, if the speed of the yarn through the test loop is increased, yarn friction will vary, causing a variation in yarn elongation, whereupon constant tension pulley 44 will tend to destabilize from a stationary vertical position. Such a tendency is overcome by manipulation of guide 36 to vary the path of the yarn returning from the test loop across the roll assembly to increase or decrease the axial distance between the paths of the yarn across the roll assembly, as dictated by whether the pulley 44 is rising or falling. The instrument is, therefore, immediately restabilized at a new level of yarn speed and the test may continue without interruption.

Obviously, numerous modifications and variations of the present invention are possible in the light of the above teachings. It is, therefore, to be understood that within the scope of the appended claims the invention may be practiced otherwise than as specifically described therein.

I claim:

1. A combination yarn feeding and take-up mechanism for use in maintaining constant the rate of a continuously running length of yarn subjected to elongation between the points of departure and re-engagement with said mechanism, which mechanism comprises a plurality of rotatably mounted tapered, circumferentially contiguous roller means, means to drive said roller means, guide means operative to selectively vary the paths of the departing and re-engaging portions of said yarn over said roller means to thereby control the differential in linear speeds of yarn departure from and re-engagement with said roller means to compensate for a given change in yarn length, whereby the weight of yarn departing said roller means may continuously equal the weight of yarn re-engaging said roller means.

2. A yarn propelling mechanism as set forth in claim 1 wherein said plurality of rollers are three in number, the axes of which intersect at a common point.

3. The mechanism recited in claim 2 wherein two of said three rollers are circumferentially contiguous with the third roller, the conical surface of said third roller being formed of a material of substantially less resilient deformability relative to the surfaces of said two rollers, said drive means being connected to said third roller.

4. The yarn propelling mechanism recited in claim 1 wherein said drive means comprises a continuously variable speed drive.

5. An apparatus for continuously measuring yarn friction at varying linear speeds and tensions comprising, in combination, a yarn propelling mechanism and a tension regulating mechanism, said propelling mechanism comprising a roller assembly having a plurality of circumferentially contiguous, uniformly tapered rollers mounted to rotate about diverging axes, variable speed drive means operative to drive said rollers at selectively variable speeds, said tension regulating mechanism comprising a free-floating, constant-tension pulley means suspended by the yarn being tested and being operative to maintain constant a pre-selected initial yarn tension, a tension measuring means, friction means interposed along the path of the yarn being tested between said constant tension pulley means and said tension measuring means, said yarn propelling mechanism being arranged to supply a continuous length of test yarn to said tension regulating mechanism at a pre-selected first linear speed and to withdraw such yarn from said tension regulating mechanism at a pre-selected second linear speed, whereby the differential in the speeds of supply and withdrawal may be established such that the same weight of yarn is withdrawn from said tension regulating mechanism as is supplied thereto, to thereby maintain said constant tension pulley means substantially vertically stationary.

6. An apparatus as recited in claim 5 and further comprising a pair of adjustable yarn guide means, said guide means being mounted adjacent said roller assembly to be selectively adjustable axially thereof, whereby one of said pair of guide means is operative to selectively vary the path of said yarn over said rollers prior to being subjected to a change in length, the other of said guide means being operative to selectively vary the path of said yarn over said rollers after being subjected to a change in length, the last mentioned path being axially spaced, relative to said rollers, from the first mentioned path.

7. The apparatus as defined in claim 5 wherein said plurality of rollers are three in number, the axes of which intersect at a common point, two of said three rollers being circumferentially contiguous with the third roller, the conical surface of said third roller being formed of a material of substantially less resilient deformability relative to the surfaces of said two rollers, said drive means being connected to said third roller.

8. A method for determining the yarn friction for different yarns at varying yarn speeds and tensions, comprising the steps of continuously supplying a length of yarn at a pre-selected first linear speed to a free-floating, constant tension pulley means, thence, passing said yarn over a friction generating means, withdrawing said yarn at a second linear speed greater than said first linear speed, measuring the tension in said yarn as it is withdrawn from said friction generating means, regulating the differential between said first and second linear speeds in such manner as will maintain said constant tension pulley means vertically stationary, whereupon the weight of yarn supplied to said friction generating means will continuously equal the weight of yarn withdrawn therefrom.

9. The method recited in claim 8 wherein the step of regulating the desired differential between said first and second linear speeds is accomplished by passing said yarn over a plurality of circumferentially contiguous, tapered, driven rollers mounted to rotate about diverging axes, prior to passing said yarn over said constant tension pulley means, again passing said yarn over said rollers subsequent to its passage over said friction generating means, the last mentioned passage being directed over larger circumferential portions of said rollers than the first mentioned passage, whereby, by varying the axial spacing, relative to said rollers, between said yarn passages over said rollers, said constant tension pulley is maintained vertically stationary.

10. The method of maintaining constant the weight of a continuously running length of yarn subjected to a variation in length between the points of departure from and re-engagement with a yarn propelling mechanism of the type having a plurality of circumferentially contiguous, cone-shaped roller means mounted to rotate without inter-roll slippage about diverging axes; said method comprising the steps of driving said rolls at a predetermined speed, passing said yarn about at least a portion of a first circumference of at least two of said roll means, whereby said yarn is fed from said roll means at a constant rate, inducing a variation in length of said yarn, passing said yarn about at least two of said roll means along a second circumference axially spaced, relative to said roll means, from said first circumference that distance sufficient to maintain a differential in the rates at which said yarn is fed out and taken up by said roll means equal to the variation per unit length per unit time induced in said yarn.

11. A yarn propelling mechanism for use in maintaining constant the weight of a continuously running length of yarn, which yarn is subjected to a change in length at a point intermediate the points of yarn departure from and re-engagement with said yarn propelling mechanism, which mechanism comprises a driven roller assembly having a plurality of rotatably mounted, circumferentially contiguous, cone-shaped rollers, drive means operatively connected to drive said roller assembly, said yarn being trained to depart and re-engage said rollers at axially spaced points therealong, a pair of adjustable yarn guide means mounted adjacent said roller assembly to be selectively adjustable substantially axially thereof, one of said guide means being operative to selectively vary the path of said yarn over said rollers prior to being subjected to a change in length, the other of said guide means being operative to selectively vary the path of said yarn over said rollers after being subjected to a change in length, whereby a pre-determined differential between the linear speeds of yarn departure from and re-engagement with said roller assembly may be maintained to thereby compensate for a given change in yarn length, whereby the weight of yarn departing said roller assembly may continuously equal the weight of yarn re-engaging said assembly.

12. An apparatus as recited in claim 5 and further comprising adjustable yarn guide means operative to selectively vary the paths of the departing and re-engaging portions of said yarn over said roller means to thereby control the differential in the linear speed of yarn departure from and re-engagement with said roller assembly.

References Cited by the Examiner

UNITED STATES PATENTS

| 2,285,255 | 6/42 | Davis | 73—160 |
| 2,730,891 | 1/56 | Frederick | 73—95.5 X |

FOREIGN PATENTS

| 644,172 | 5/28 | France. |
| 415,812 | 7/25 | Germany. |

RICHARD C. QUEISSER, *Primary Examiner.*

ROBERT EVANS, JOSEPH P. STRIZAK, *Examiners.*